US008772959B2

(12) United States Patent
Lee

(10) Patent No.: US 8,772,959 B2
(45) Date of Patent: Jul. 8, 2014

(54) VERTICAL WIND TURBINE GENERATOR WITH VENTILATOR

(75) Inventor: Tsung Chieh Lee, Kaohsiung (TW)

(73) Assignees: Tsung Chieh Lee, Kaohsiung (TW); Wen Hsih Chang, Piscataway, NJ (US)

( * ) Notice: Subject to any disclaimer, the term of this patent is extended or adjusted under 35 U.S.C. 154(b) by 85 days.

(21) Appl. No.: 13/557,377

(22) Filed: Jul. 25, 2012

(65) Prior Publication Data
US 2013/0049373 A1 Feb. 28, 2013

(30) Foreign Application Priority Data

Aug. 24, 2011 (TW) .............................. 100215768 U

(51) Int. Cl.
F03D 11/00 (2006.01)
(52) U.S. Cl.
USPC ............................................. 290/55; 290/44

(58) Field of Classification Search
USPC .................... 290/55, 43, 44; 454/240; 416/23
See application file for complete search history.

(56) References Cited

U.S. PATENT DOCUMENTS

| 6,798,082 | B1* | 9/2004 | Chen | 290/55 |
| 2003/0190883 | A1* | 10/2003 | Shockey | 454/19 |
| 2010/0270804 | A1* | 10/2010 | Datel | 290/55 |
| 2011/0089698 | A1* | 4/2011 | Ahmadi | 290/55 |
| 2012/0038162 | A1* | 2/2012 | Smith et al. | 290/52 |

* cited by examiner

Primary Examiner — Vanessa Girardi

(57) ABSTRACT

A Vertical Wind Turbine Generator with Ventilator is consisted of three components: a vertical wind turbine assembly, a ventilator, and a generator. This device can be installed on roof opening, or any other locations for power generation and ventilation. The power generation is coaxially connected to, and housed within, the ventilator, which is further connected with the wind turbine assembly. When the wind-turbines assembly is rotated as driven by wind, the ventilator and the power generator will be driven by the wind turbine assembly to exhausts hot air and generate power simultaneously.

5 Claims, 8 Drawing Sheets

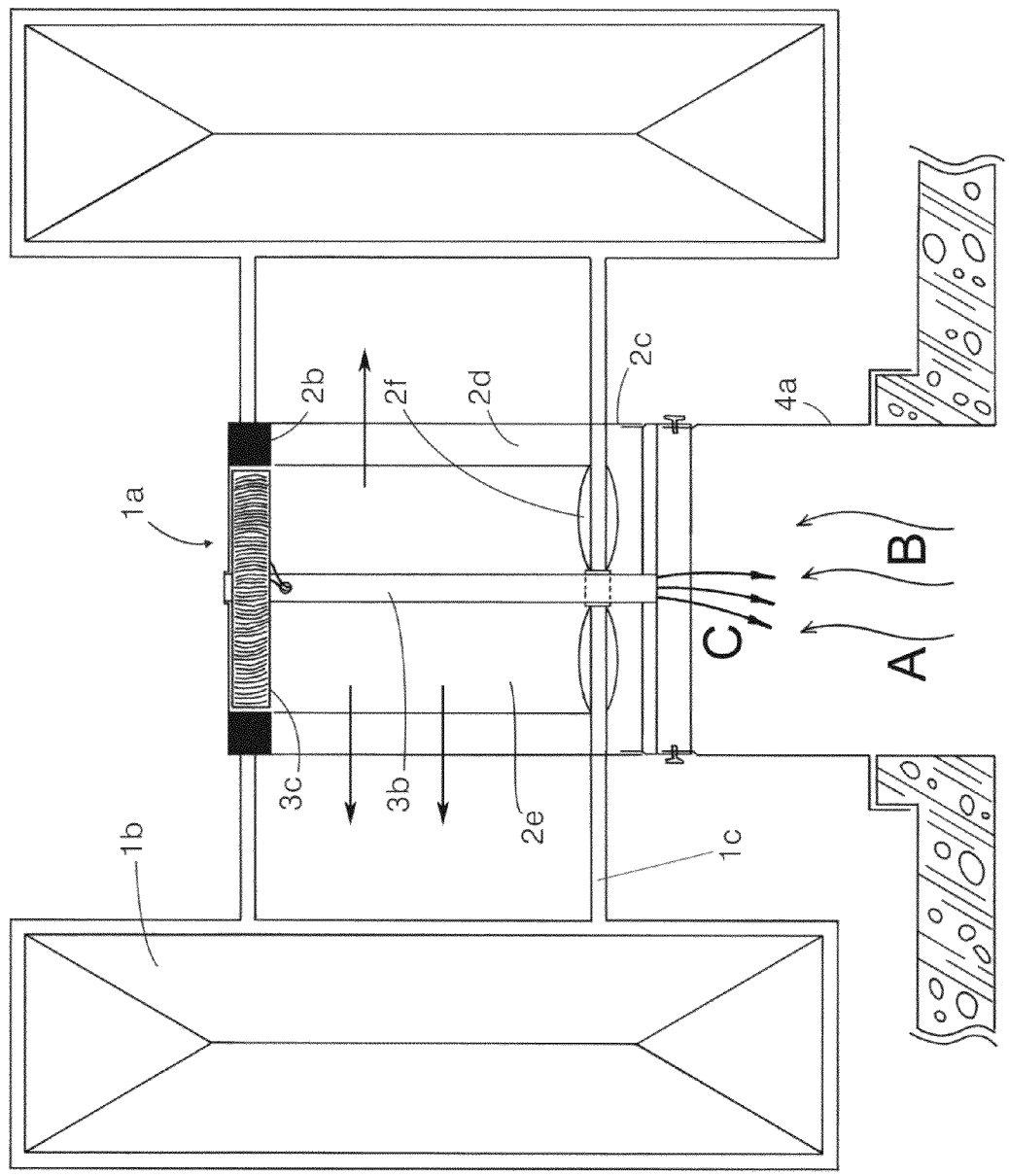

US 8,772,959 B2

VERTICAL WIND TURBINE GENERATOR WITH VENTILATOR

The current application claims a foreign priority to the patent application of Taiwan No. 100215768 filed on Aug. 24, 2011.

BACKGROUND OF THE INVENTION

1. Field of the Invention

The subject invention entails a wind-propelled vertical turbine device that drives a power generator and a ventilator, or any heat dissipation device.

2. Descriptions of the Prior Related Arts

The conventional roof ventilator is a kind of miniature windmill. When wind blows onto the blades the blades are rotated to exhaust hot air to outdoors. The ventilator typically does not incorporate the function of power generation. Even if the conventional ventilator was to be equipped with a generator, the typical ventilator blades have relatively small wind-catching area that the wind-powered torsion can hardly feed the power generator. Therefore, it is difficult for the conventional ventilator to provide additional power-generation function.

SUMMARY OF THE INVENTION

It is the objectives of the subject invention to design a ventilator that will provide both power generation and ventilation through utilizing the most abundant and renewable wind energy.

To achieve the above objectives, the subject invention incorporates three hardware components, namely, the vertical, multiple-blade wind turbine, a ventilator, and a power generator. All three components are inter-connected as an integral assembly that can provide ventilation function while generating electrical power.

The purposes of the subject invention can be best achieved by installing the subject invention in the region with abundant wind flow.

Through catching the wind energy the wind turbines will rotate and a significant torsion is created to concurrently drive the power generator and cause the ventilation blades to rotate to create outward airflow.

The wind turbine component is a vertical, multiple-blade assembly designed to effectively catch wind energy. The size of the blades are enlarged and properly angled to maximize the catching of wind volume.

The power generator assembly incorporates a coil winding on top, a shaft, and a bottom tray. The coil winding interacts with the magnet assembly on top of the ventilator housing for generating power.

The ventilator consists of an upper disc-like magnet assembly circumferentially connected with multiple vertical ventilation blades and a lower rotary tray rotatably fitted on the shaft of the power generator by means of a bearing. The upper disc-like magnet assembly, the lower rotary tray and the vertical ventilation blades are assembled to form a cylindrical housing. The shaft protrudes upwardly from the center of the disc-like magnet assembly to be rotatably connected with the wind turbine, and driven by such wind turbine.

In order to increase hot air exhaustion efficiency there are multiple circulation acceleration blades placed on the rotary tray of the ventilator to help speed up exhausting/ventilating process, whereby the hot air can be quickly exhausted through the turning of ventilating blades.

The subject invention can be further explained through the following descriptions and accompanying drawings, wherein:

BRIEF DESCRIPTIONS OF THE DRAWINGS

FIG. 8 is an elevation view of dissipated hot air flow path of the second embodiment of the subject invention.

DETAILED DESCRIPTIONS OF PREFERRED EMBODIMENTS

Figure 1:
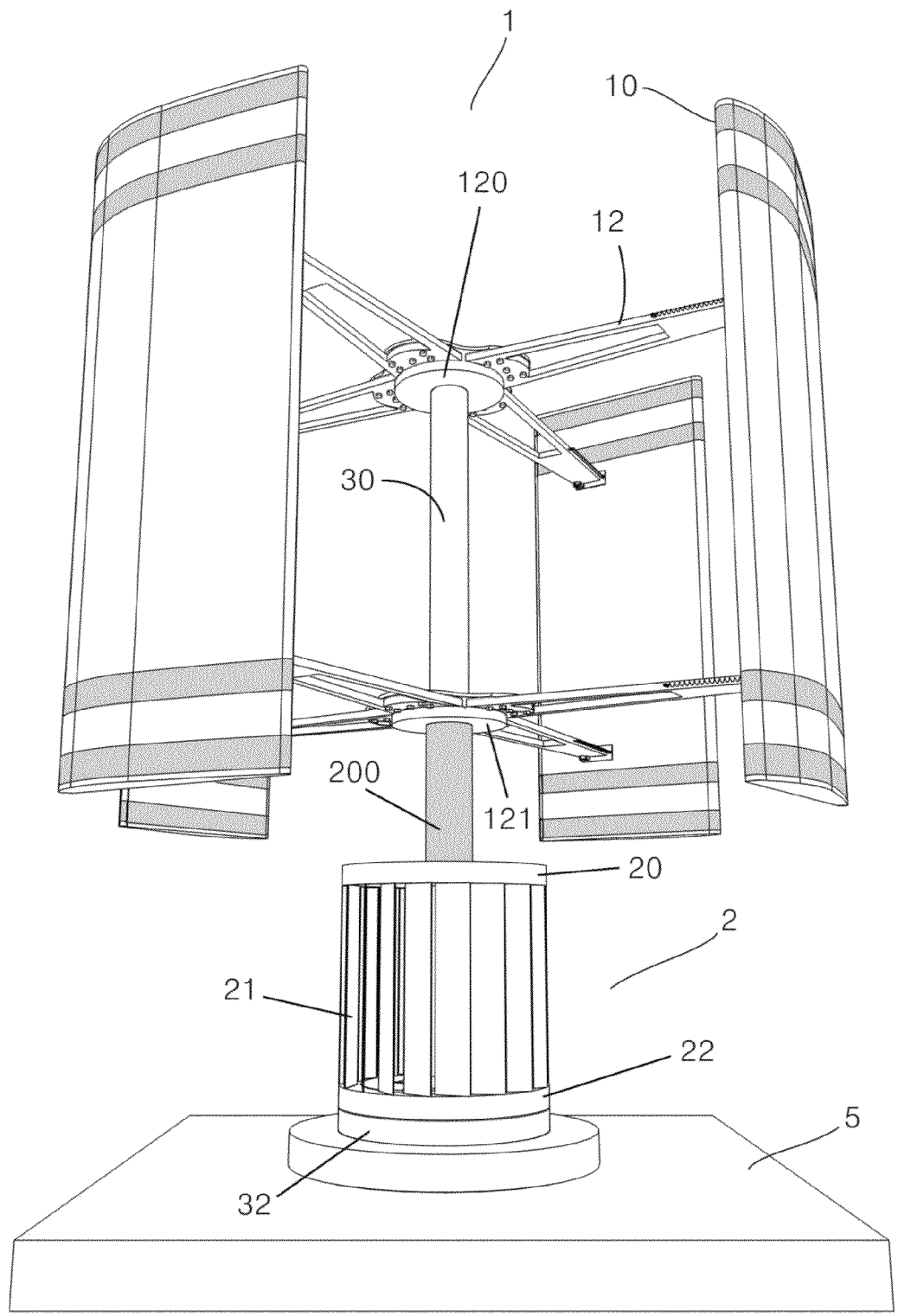
FIG. 1 is a perspective assembly view of the first embodiment of the subject invention.
Figure 2:
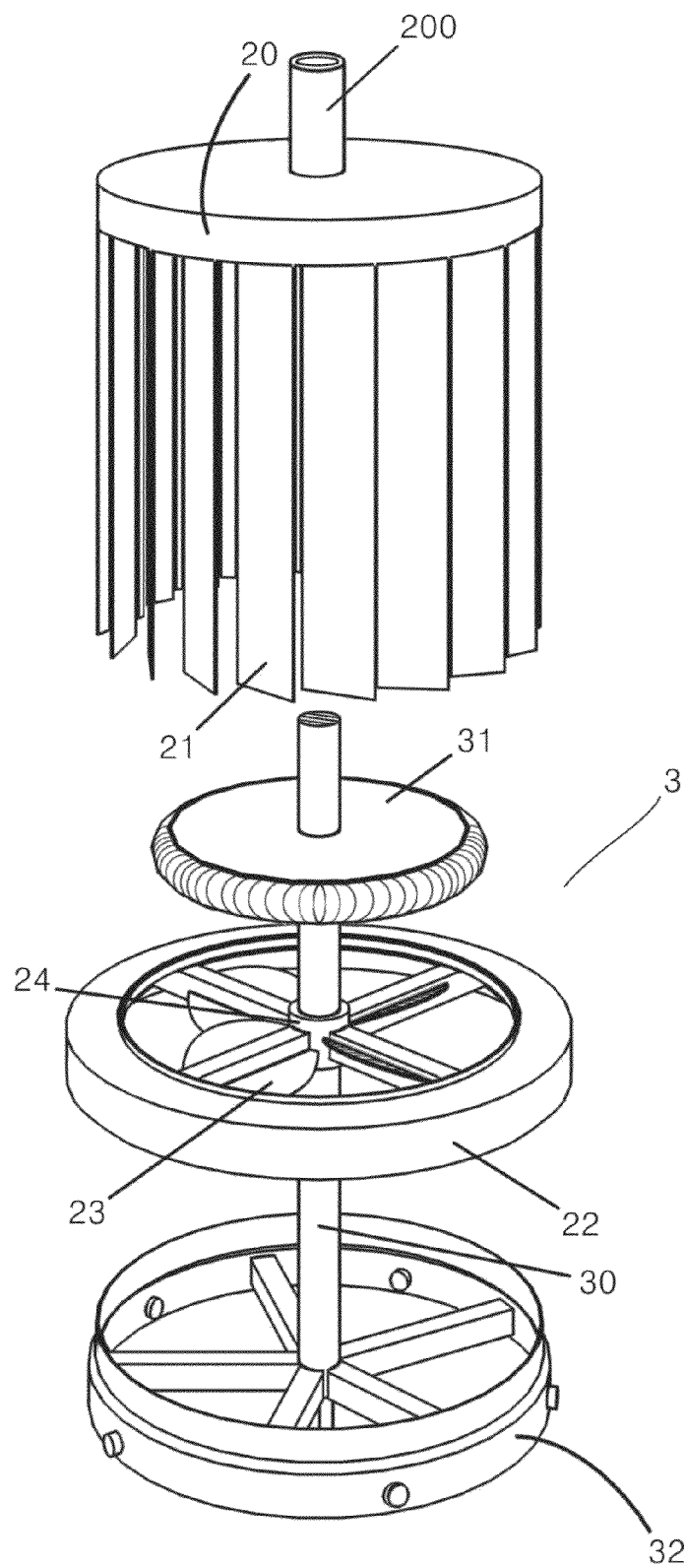
FIG. 2 is a perspective exploded view of ventilator and power generator of the first embodiment of the subject invention.
Figure 3:
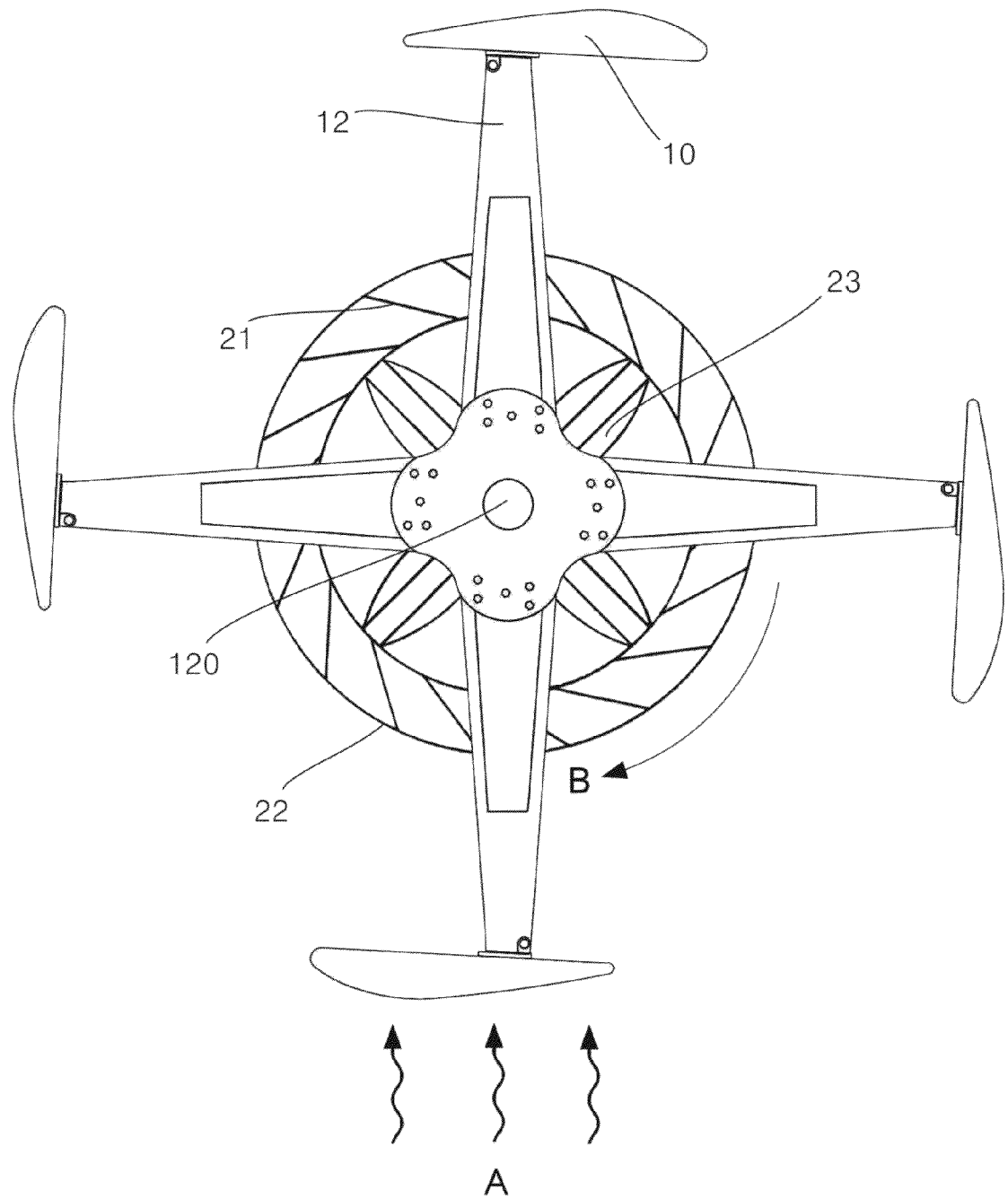
FIG. 3 is an operational plan view of wind turbine and cylindrical ventilator housing of the first embodiment of the subject invention.
Figure 4:
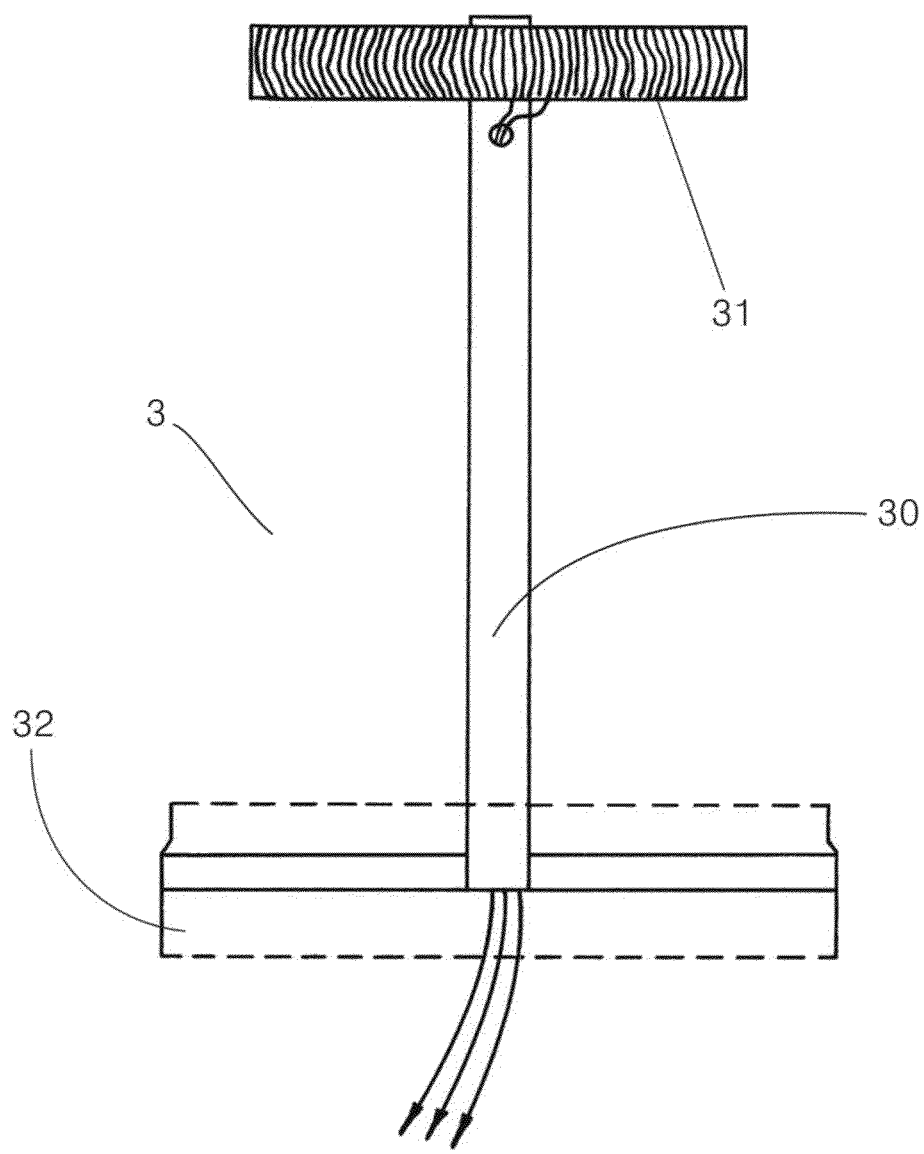
FIG. 4 is a schematic view of power generating assembly of the first embodiment of the subject invention.

The subject invention is illustrated through the following two preferred embodiments.

First Embodiment

The First Embodiment of the subject invention is shown from FIG. 1 through FIG. 5.

The subject invention comprises three major elements: a wind catching device 1, a ventilating device 2, and a power generating device 3.

The wind-catching device 1 is composed of multiple wind-turbine blades 10, each connected with upper and lower supporting frames 12, which are connected to the shaft 30 by means of two bearings 120, 121. The shaft 30 is further connected to the ventilator 2 and power generator 3. The ventilator device 2 for ventilation is composed of a top disk-like magnet assembly 20, a bottom rotary tray 22, and multiple vertical blades 21 formed in between the magnet assembly 20 and the tray 22, which form a cylindrical structure having an air chamber 210 defined therein. A sleeve 200 protrudes from the center of an upper end of the disc-like magnet assembly 20 to connect the bearing 121 and the supporting frames 12 of the wind-turbine blades 10, whereby the sleeve 200 can be rotated about the shaft 30 as driven by the wind-turbine blades 10. In addition, there are multiple circulation acceleration blades 23 radially formed in the rotary tray 22, and rotatably connected to the shaft 30 by a bearing 24, and the shaft 30 is axially connected to the the power generation device 3.

The power generation device 3 is composed of a coil winding assembly 31 on a top portion of the shaft 30 and a circular bottom tray 32, formed on a bottom of the shaft 30. The bottom tray 32 is to mounted on a top edge of a roof opening 5. The coil winding assembly 31 is to be snugly received in a top portion of the ventilator housing 210 to cause induction between the coil winding 31 and the disk-like magnet assembly 20 to generate power. The shaft 30 protrudes upwardly from the power generator to connect two bearings 120, 121 which are respectively radially connected with and driven by the wind-turbine blades 10 to form the present invention provide the duel function of power generation and ventilation when mounted at the roof opening.

Figure 5:
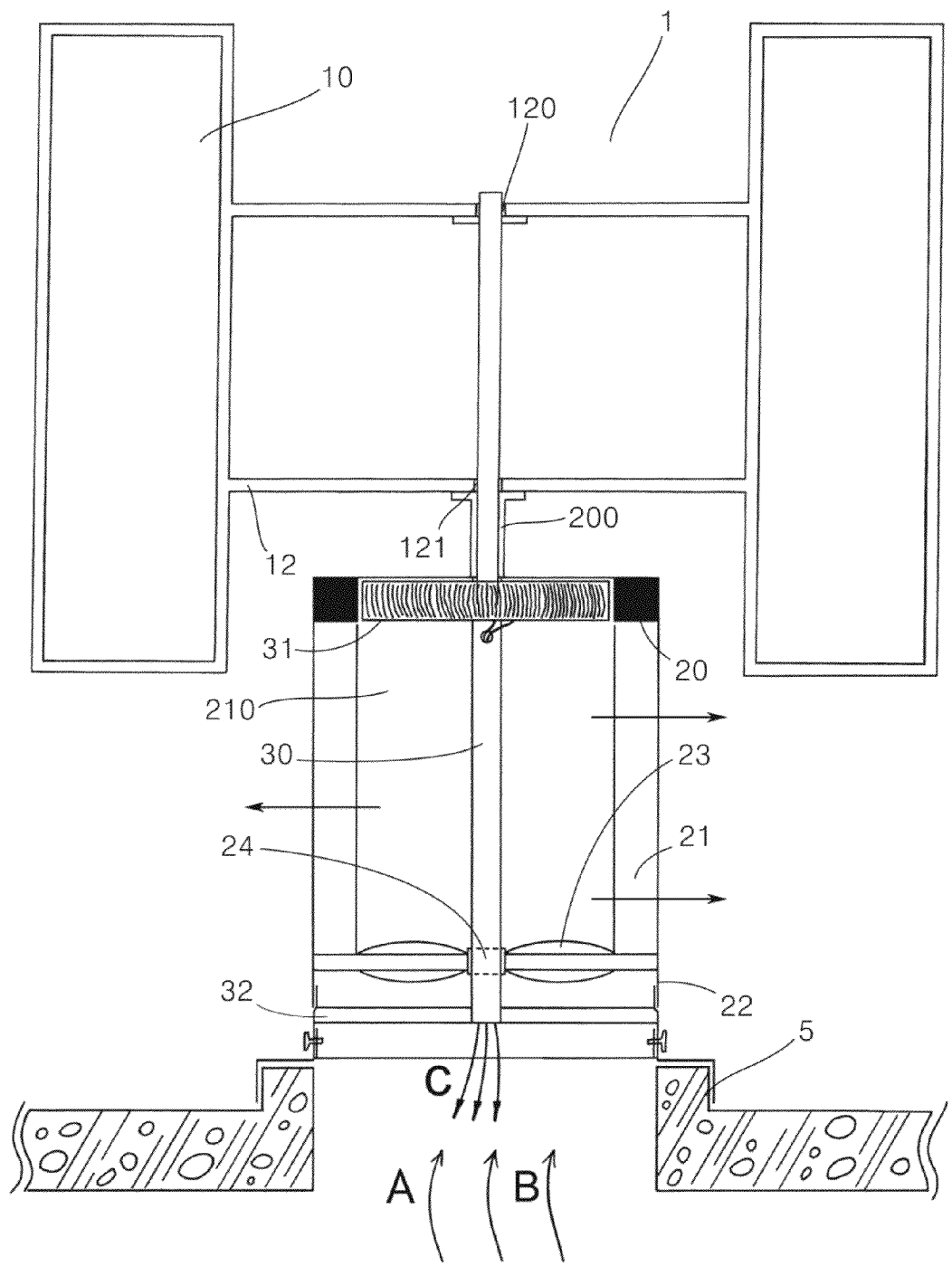
FIG. 5 is a schematic elevation view of the path of dissipated hot air flow of the first embodiment of the subject invention.

Please refer to FIG. 5, when the wind-turbine blades 10 are rotatably driven by wind, the shaft 30 and the disk-like magnetic assembly 20 will be driven to rotate with respect to the coil winding assembly 31 to generate electricity. Meanwhile, the hot air B as gathered under a roof will be drafted through the roof opening A into the ventilator housing 210, as blown by the circulation acceleration blades 23, and then discharged through the openings among the vertical blades to thereby reduce the room temperature within the building.

Second Embodiment

Figure 6:
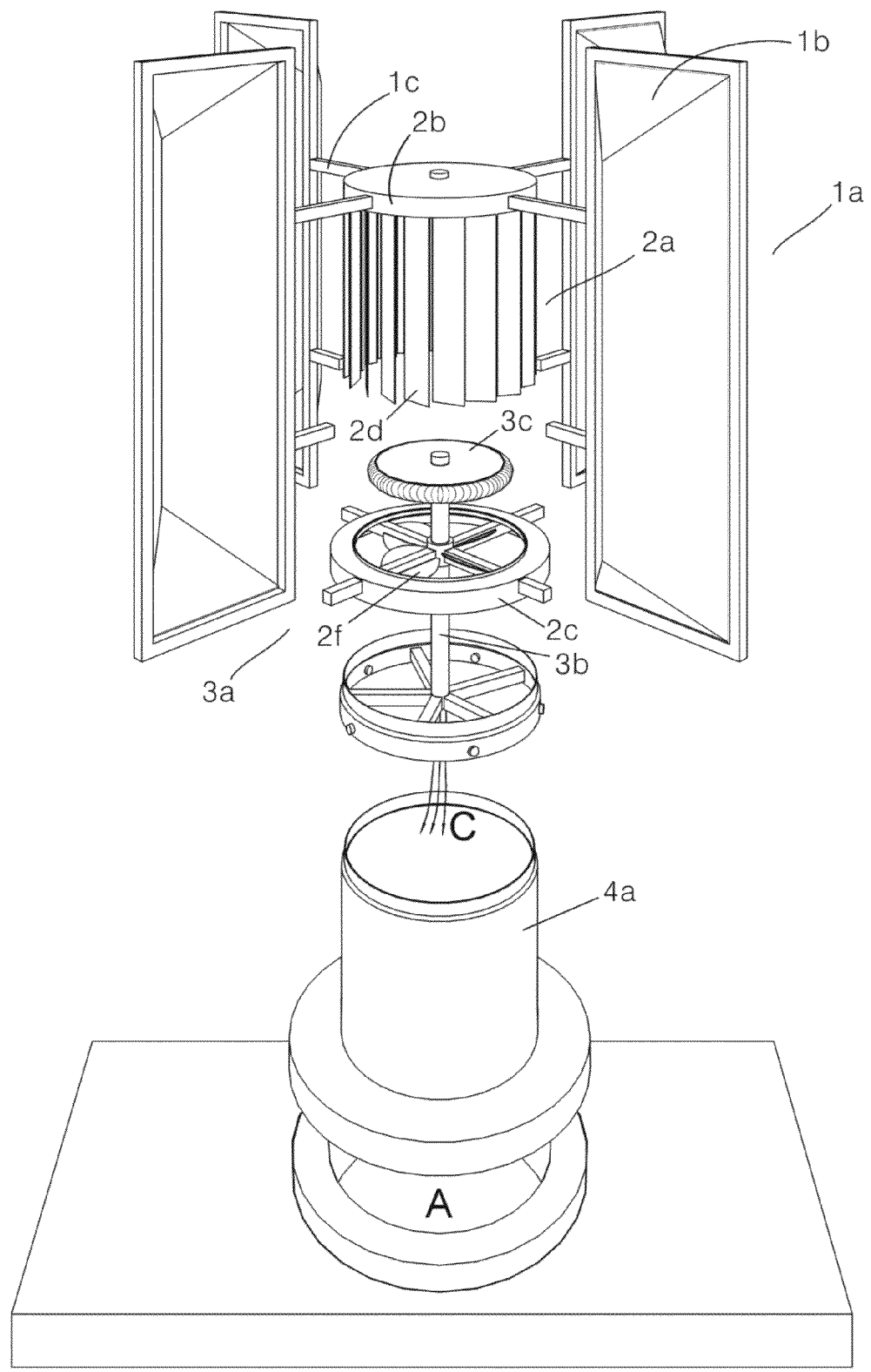
FIG. 6 is a full perspective exploded view of the second embodiment of the subject invention.
Figure 7:
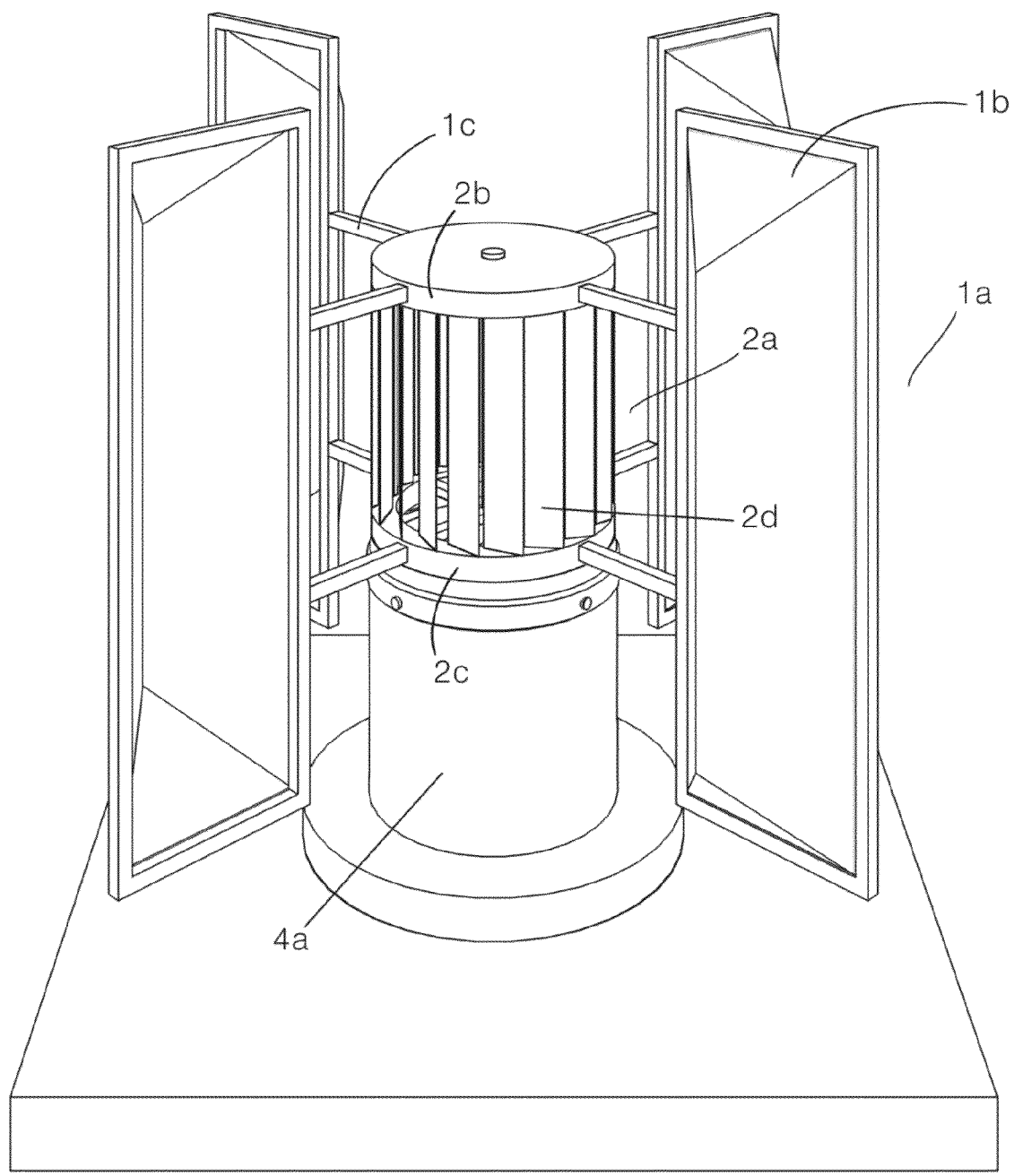
FIG. 7 is a perspective assembly view of the second embodiment of the subject invention.

The second embodiment of the subject invention is shown from FIG. 6 through FIG. 8.

The second embodiment of the subject invention, the Vertical Wind Turbine Generator with Ventilator, includes a wind turbine assembly 1a, a ventilator 2a and a power generator 3a, which is the same as the first embodiment. In the second embodiment, the wind-turbine blades 1b of the wind turbine assembly 1a are respectively connected to the disc-like magnet assembly 2b and the rotary tray 2c of the ventilator 2a by supports 1c. When the wind-turbine blades 1b, connected to the ventilator unit 2a, are rotated as blown by wind, the disc-like magnet assembly 2b of the ventilator 2a rotates around the power generator coil winding assembly 3c, fitted on the shaft 3b, to generate power output C. In addition, due to thermal circulation, hot air B in the room gathers and ascends toward the ceiling and passes through a raised barrel 4a, which is connected to the opening A on the roof. Then the hot air enters the hollow space 2e defined by the exhaustion blades 2d of the ventilator 2a. The circulation acceleration blades 2f of the rotary tray 2c then drive the hot air to pass through the exhaustion blades 2d to exit the room. Consequently, while generating power the room temperature is also lowered.

The above two preferred embodiments are used to demonstrate the subject invention, but not to limit the scope thereof. A few modifications to the above embodiments can be made without deviating from the principle of the present invention.

What is claimed is:

1. A vertical wind turbine generator with ventilator comprising:
a wind turbine assembly, including multiple vertical wind-turbine blades respectively secured to a plurality of supporting frames which are rotatably secured to a shaft;
a ventilator, which is a cylindrical body with a metal housing, including a disc-like magnet assembly formed on a top of said cylindrical body, multiple exhaustion blades equally spaced and vertically arranged under the disc-like magnet assembly, and a rotary tray formed on a bottom of said cylindrical body and having multiple circulation acceleration blades symmetrically formed on a plurality of spokes of the rotary tray, with a sleeve protruding upwardly from a center of an upper end of the disc-like magnet assembly to connect the supporting frames of the wind-turbine blades, the sleeve rotatably driven about the shaft by the vertical wind-turbine blades; and
a power generator, located within the housing of the cylindrical body, including a coil winding assembly secured to said shaft to be corresponding to the disc-like magnet assembly, and a bottom tray secured to a bottom of said shaft and mounted on a top of a roof opening of a room;
whereby when the wind-turbine blades are rotated as driven by wind, the ventilator and the power generator are driven to rotate simultaneously to generate power by said power generator and exhaust air out of the room by said ventilator.

2. The vertical wind turbines generator with ventilator as claimed in claim 1, wherein the wind-turbine blades are vertically oriented, each said wind-turbine blade having a cross section equivalent to a cross section of airplane wing.

3. The vertical wind turbine generator with ventilator as claimed in claim 1, wherein the shaft of the power generator is a hollow tubular body for receiving leads of the coil winding assembly, and said shaft extends upwardly from the bottom tray.

4. A vertical wind turbine generator with ventilator comprising:
a wind catching assembly including multiple wind-turbine blades and multiple supports connected with the wind-turbine blades;
a heat dissipation ventilator, which is a cylindrical body having a hollow space defined therein, and which includes a disc-like magnet assembly formed on a top of said cylindrical body, multiple exhaustion blades equally spaced and vertically arranged under the disc-like magnet assembly, and a rotary tray formed on a bottom of said cylindrical body, said wind-turbine blades radially secured to a periphery of the disc-like magnet assembly by said supports, whereby the disc-like magnet assembly is rotatably driven by the wind-turbines blades; and
a power generation unit, which is received in the hollow space of the cylindrical body, including a power generation coil winding secured to a top of a shaft and corresponding to the disc-like magnet assembly, and a bottom tray secured to a bottom of said shaft.

5. The vertical wind turbine generator with ventilator as claimed in claim 4, wherein said bottom tray is connected to a raised metal barrel, said raised metal barrel affixed to a roof opening.

* * * * *